(12) United States Patent
Moulton et al.

(10) Patent No.: US 6,217,743 B1
(45) Date of Patent: Apr. 17, 2001

(54) PROCESS FOR RECOVERING ORGANIC HYDROXIDES FROM WASTE SOLUTIONS

(75) Inventors: Roger D. Moulton; Weilian Lang, both of Austin; Allen Tanner, Burnet, all of TX (US)

(73) Assignee: Sachem, Inc., Austin, TX (US)

( * ) Notice: Subject to any disclaimer, the term of this patent is extended or adjusted under 35 U.S.C. 154(b) by 0 days.

(21) Appl. No.: 09/370,682

(22) Filed: Aug. 9, 1999

Related U.S. Application Data

(63) Continuation-in-part of application No. 08/810,399, filed on Mar. 4, 1997, now Pat. No. 5,951,845.

(51) Int. Cl.[7] .................................................. C02F 1/461
(52) U.S. Cl. ...................... 205/746; 205/748; 205/688; 204/522; 204/537
(58) Field of Search .................................. 205/688, 703, 205/746, 747, 748; 204/522, 537

(56) References Cited

U.S. PATENT DOCUMENTS

| | | | |
|---|---|---|---|
| 3,402,115 | * 9/1968 | Campbell et al. | 204/180 |
| 4,714,530 | 12/1987 | Hale et al. | 204/131 |
| 4,931,155 | 6/1990 | Dutcher et al. | 204/72 |
| 5,071,819 | 12/1991 | Tarbet et al. | 502/401 |
| 5,316,679 | 5/1994 | Bruening | 210/634 |
| 5,354,434 | 10/1994 | Satoh et al. | 204/72 |
| 5,389,211 | 2/1995 | Shalrflan et al. | 204/72 |
| 5,393,892 | 2/1995 | Kraowiak et al. | 549/214 |
| 5,405,508 | 4/1995 | Kawakami et al. | 204/102 |
| 5,547,760 | 8/1996 | Tarbet et al. | 428/471 |

FOREIGN PATENT DOCUMENTS

| | | | |
|---|---|---|---|
| 0597460 | 5/1994 | (EP) | B01J/39/04 |
| 3-20489 | 1/1991 | (JP) | C25B/3/00 |
| 4-228587 | 8/1992 | (JP) | C25B/3/04 |
| WO96/14125 | 5/1996 | (WO) | B01D/15/00 |

* cited by examiner

*Primary Examiner*—Kathryn Gorgos
*Assistant Examiner*—Thomas H Parsons
(74) *Attorney, Agent, or Firm*—Renner, Otto, Boisselle & Sklar

(57) ABSTRACT

In one embodiment, the present invention relates to a process for recovering an onium compound from waste solutions or synthetic solutions containing the onium compound and impurities including the steps: contacting the waste solution or synthetic solution with a metal ion scavenger to remove metal ion impurities, wherein the metal ion scavenger comprises at least one of a chelating compound, a nanoporous material, and a magnetically assisted (MACS) material; charging the waste solution or synthetic solution to an electrochemical cell containing at least two compartments, a cathode, an anode and a divider and passing a current through the cell whereby the onium compound is regenerated or produced; and recovering the onium compound from the cell.

28 Claims, 2 Drawing Sheets

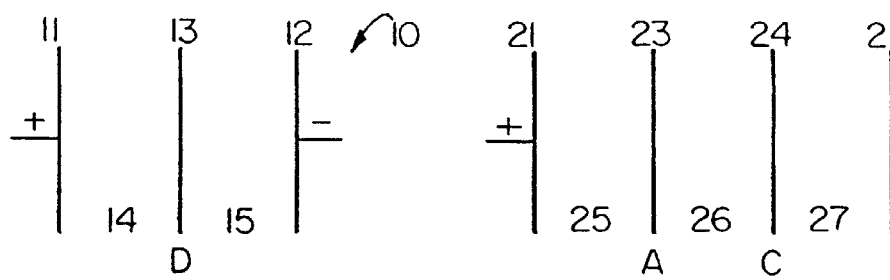
FIG. 1
FIG. 2
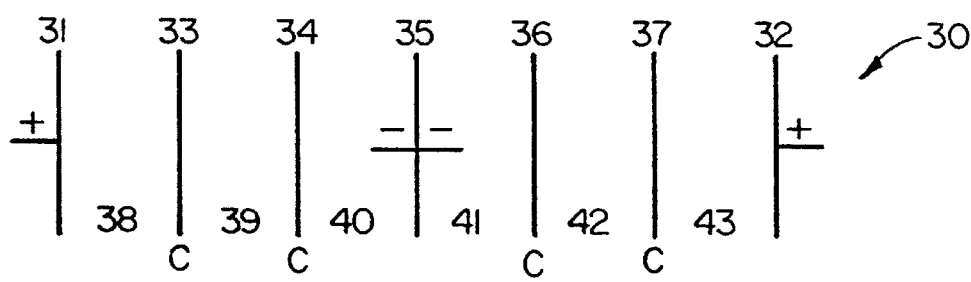
FIG. 3
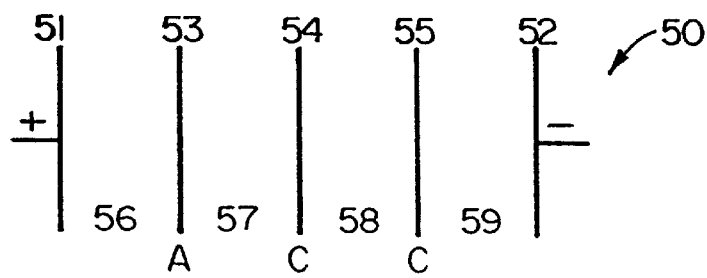
FIG. 4
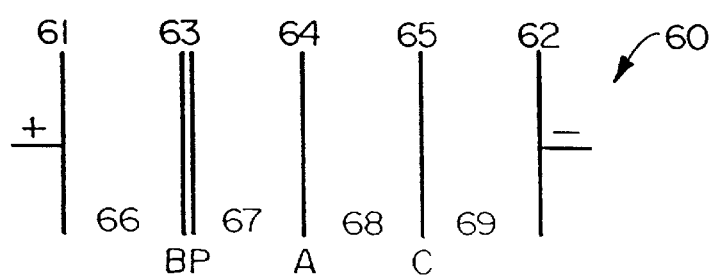
FIG. 5

PROCESS FOR RECOVERING ORGANIC HYDROXIDES FROM WASTE SOLUTIONS

RELATED APPLICATION

This application is a continuation-in-part of application Ser. No. 08/810,399 filed on Mar. 4, 1997 now U.S. Pat. No. 5,951,845

BACKGROUND OF THE INVENTION

1. Field of the Invention

This invention relates to a process for recovering organic hydroxides from waste solutions. In particular, the invention relates to a process for recovering organic hydroxides using a metal ion scavenger and an electrochemical cell.

2. Description of the Related Art

Quaternary ammonium hydroxides such as tetramethylammonium hydroxide (TMAH) and tetraethylammonium hydroxide (TEAH) are strong organic bases that have been known for many years. Such quaternary ammonium hydroxides have found a variety of uses including use as a titrant for acids in organic solvents and as a supporting electrolyte in polarography. Aqueous solutions of quaternary ammonium hydroxides, particularly TMAH solutions, have been used extensively as a developer for photoresists in printed circuit board and microelectronic chip fabrication. For a variety of reasons, it is desirable to minimize the overall amount of developer used in printed circuit board and microelectronic chip fabrication. One way to minimize the overall amount of hydroxide developer is to reuse the waste developer. Reusing developer reduces the amount lost and decreases disposal problems.

However, waste developer contains impurities including ionic impurities and nonionic impurities. Ionic impurities include cations such as sodium, potassium, zinc and calcium; and anions such as halides, nitrates, nitrites, carbonates, carboxylates, sulfates. Nonionic impurities include photoresists, surfactants, amines and numerous other organic molecules. Waste developer also contains relatively low concentrations of the hydroxide developer. Accordingly, there remains a continuing need to effectively recover hydroxide developer in a useable form so that it may be reused thereby minimizing the overall amount of developer used in printed circuit board and microelectronic chip fabrication.

U.S. Pat. No. 4,714,530 (Hale et al) describes an electrolytic process for preparing high purity quaternary ammonium hydroxides which utilizes a cell containing a catholyte compartment and an anolyte compartment separated by a cation-exchange membrane. The process comprises charging an aqueous solution of a quaternary ammonium hydroxide to the anolyte compartment, adding water to the catholyte compartment, and passing a direct current through the electrolysis cell to produce a higher purity quaternary ammonium hydroxide in the catholyte compartment which is subsequently recovered. The '530 patent also describes an improvement which comprises heating the quaternary ammonium hydroxide at an elevated temperature prior to charging the hydroxide to the anolyte compartment of the electrolytic cell.

U.S. Pat. No. 4,938,854 (Sharifian et al) also describes an electrolytic process for purifying quaternary ammonium hydroxides by lowering the latent halide content. The electrolytic cell may be divided into an anolyte compartment and a catholyte compartment by a divider which may be an anion or cation selective membrane. The cathode in the catholyte compartment comprises zinc, cadmium, tin, lead, copper or titanium, or alloys thereof, mercury or mercury amalgam.

Japanese Kokai Patent No. 60-131985 (1985) (Takahashi et al) describes a method of manufacturing a high purity quaternary ammonium hydroxide in an electrolysis cell which is divided into an anode chamber and a cathode chamber by a cation exchange membrane. A quaternary ammonium hydroxide solution containing impurities is charged to the anode chamber and a direct current is supplied between two electrodes after water has been charged to the cathode chamber. Purified quaternary ammonium hydroxide is obtained from the cathode chamber. The purified quaternary ammonium hydroxide contains reduced amounts of alkali metals, alkaline earth metals, anions, etc.

SUMMARY OF THE INVENTION

In one embodiment, the present invention relates to a process for recovering an onium compound from waste solutions or synthetic solutions containing the onium compound and impurities including the steps: contacting the waste solution or synthetic solution with a metal ion scavenger to remove metal ion impurities, wherein the metal ion scavenger comprises at least one of a chelating compound, a nanoporous material, and a magnetically assisted chemical separation (MACS) material; charging the waste solution or synthetic solution to an electrochemical cell containing at least two compartments, a cathode, an anode and a divider and passing a current through the cell whereby the onium compound is regenerated or produced; and recovering the onium compound from the cell.

In another embodiment, the present invention relates to a process for recovering onium hydroxide from waste solutions or synthetic solutions containing the onium hydroxide and impurities including metal ion impurities including the steps: contacting the waste solution or synthetic solution with at least one of a chelating compound, a nanoporous material, and a MACS material thereby decreasing the amount of metal ion impurities in the waste solution or synthetic solution; charging the waste solution or synthetic solution to an electrochemical cell containing at least two compartments, a cathode, an anode and a cation selective membrane and passing a current through the cell whereby onium ions pass through the cation selective membrane and onium hydroxide is regenerated or produced; and recovering the onium hydroxide from the cell.

In yet another embodiment, the present invention relates to a process for recovering an onium compound from waste solutions or synthetic solutions containing the onium compound and impurities including metal ion impurities including the steps: charging the waste solution or synthetic solution to an electrochemical cell containing at least two compartments, a cathode, an anode and a divider and passing a current through the cell whereby onium ions pass through the divider and the onium compound is regenerated or produced; recovering an onium compound solution from the cell; contacting the onium compound solution with a metal ion scavenger to remove metal ion impurities, wherein the metal ion scavenger comprises at least one of a chelating compound, a nanoporous material, and a MACS material; and recovering the onium compound.

In still yet another embodiment, the present invention relates to a process for recovering onium hydroxide from waste solutions or synthetic solutions containing the onium hydroxide and impurities including metal ion impurities including the steps: charging the waste solution or synthetic solution to an electrochemical cell containing at least two compartments, a cathode, an anode and a divider and passing a current through the cell whereby onium ions pass through the divider and onium hydroxide is regenerated or produced; recovering onium hydroxide solution from the cell; contacting the onium hydroxide solution with at least one of a chelating compound, a nanoporous material, and a MACS material to remove metal ion impurities; and recovering the onium hydroxide.

As a result of the processes of the claimed invention, recycled solutions of organic hydroxides and newly synthesized solutions of organic hydroxides and salts can be obtained in which the concentration and purity is increased. Recycling spent solutions of organic hydroxides provides not only cost savings, but also environmental benefits by eliminating the need for synthesizing new hydroxide compound solutions and associated expensive purification processes and reducing the toxicity of waste solution effluents. An increased amount of water can be recovered after organic hydroxides are removed from solution. Additionally, it is not necessary to store large amounts of chemicals. The relatively high concentration and purity of organic hydroxide solutions obtainable via the present invention can effectively be used in numerous applications where organic hydroxide solutions are required.

DESCRIPTION OF THE DRAWINGS

FIG. 1 is a schematic representation of a two compartment electrochemical cell containing one unit cell in accordance with the present invention.

FIG. 2 is a schematic representation of a three compartment electrochemical cell in accordance with the invention.

FIG. 3 is a schematic representation of an electrochemical cell containing a stack of two unit cells in a monopolar configuration.

FIG. 4 is a schematic representation of a four compartment electrochemical cell in accordance with the present invention.

FIG. 5 is a schematic representation of another four compartment electrochemical cell in accordance with the present invention.

DESCRIPTION OF THE PREFERRED EMBODIMENTS

Figure 6:
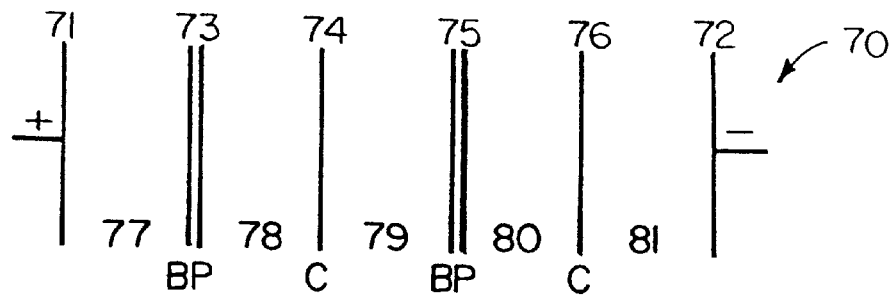
FIG. 6 is a schematic representation of an electrochemical cell containing two unit cells in accordance with the present invention.

In one embodiment, the process of the present invention is useful in purifying organic hydroxide compounds such as onium hydroxides. The organic hydroxides may generally be characterized by the formula $$A(OH)_x \quad (I)$$

wherein A is an organic group and x is an integer equal to the valence of A. In one embodiment, the hydroxide compound should be sufficiently soluble in a solution such as water, alcohol or other organic liquid, or mixtures thereof to allow a useful recovery rate.

In another embodiment, the process of the present invention is useful in preparing purified organic hydroxides from their corresponding onium salts, and for purifying solutions of these onium salts, which in turn, lead to purer onium hydroxides. Organic hydroxides include quaternary ammonium hydroxides, quaternary phosphonium hydroxides and tertiary sulfonium hydroxides. These organic hydroxides may be collectively referred to as onium hydroxides. Preparation solutions may be termed synthetic solutions (synthetic solutions including solutions of synthesized onium hydroxides and onium salt solutions used to make onium hydroxides). Onium compounds therefore include organic hydroxides, onium hydroxides and onium salts. In this and other embodiments, A in Formula (I) above is an onium compound, and Formula (I) represents an onium hydroxide.

The quaternary ammonium and quaternary phosphonium hydroxides may be characterized by the formula

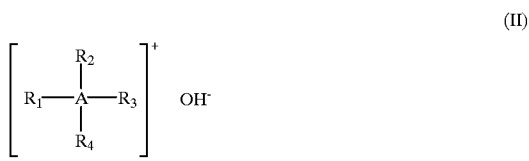

(II)

wherein A is a nitrogen or phosphorus atom, $R_1$, $R_2$, $R_3$ and $R_4$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R_1$ and $R_2$ together with A may form a heterocyclic group provided that if the heterocyclic group contains a C=A group, $R_3$ is the second bond.

The alkyl groups $R_1$ to $R_4$ may be linear or branched, and specific examples of alkyl groups containing from 1 to 20 carbon atoms include methyl, ethyl, propyl, butyl, pentyl, hexyl, heptyl, octyl, isooctyl, nonyl, decyl, isodecyl, dodecyl, tridecyl, isotridecyl, hexadecyl and octadecyl groups. $R_1$, $R_2$, $R_3$ and $R_4$ also may be hydroxyalkyl groups such as hydroxyethyl and the various isomers of hydroxypropyl, hydroxybutyl, hydroxypentyl, etc. In one preferred embodiment, $R_1$–$R_4$ are independently alkyl groups containing one to ten carbon atoms and hydroxyalkyl groups containing from two to three carbon atoms. Specific examples of alkoxyalkyl groups include ethoxyethyl, butoxymethyl, butoxybutyl, etc. Examples of various aryl and hydroxyaryl groups include phenyl, benzyl, and equivalent groups wherein benzene rings have been substituted with one or more hydroxy groups.

The quaternary ammonium hydroxides which can be recycled or purified in accordance with the process of the present invention may be represented by Formula III

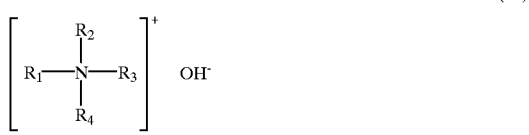

(III)

wherein $R_1$–$R_4$ are as defined in Formula II. In one preferred embodiment, $R_1$–$R_4$ are alkyl groups containing from 1 to about 4 carbon atoms and hydroxyalkyl groups containing 2 or 3 carbon atoms. Most often the quaternary ammonium hydroxides purified in accordance with the process of the invention will be tetramethylammonium hydroxide (TMAH) or tetraethyl-ammonium hydroxide (TEAH). Specific examples of other such hydroxides include tetramethylammonium hydroxide, tetraethylammonium hydroxide, tetrapropylammonium hydroxide, tetrabutylammonium hydroxide, tetra-n-octylammonium hydroxide, trimethylhydroxyethylammonium hydroxide, trimethylmethoxyethylammonium hydroxide, dimethyldihydroxyethylammonium hydroxide, methyltrihydroxyethylam-monium hydroxide, phenyltrimethylammonium hydroxide, phenyltriethylam-monium hydroxide, benzyltrimethylammonium hydroxide, benzyltriethylam-monium hydroxide, dimethylpyrolidinium hydroxide, dimethylpiperidinium hydroxide, diisopropy-limidazolinium hydroxide, N-alkylpyridinium hydroxide, etc.

Examples of quaternary ammonium salts include the corresponding halides, carbonates, bicarbonates, formates, nitrates and sulfates to the hydroxides mentioned above. Additional examples include ethylmethylimid-azolinium chloride, butylmethylimidazolinium chloride, ethylmethylimid-azolinium bromide, and butylmethylimidazolinium bromide.

Examples of quaternary phosphonium hydroxides representative of Formula II wherein A=P which can be purified in accordance with the process of the present invention include tetramethylphosphonium hydroxide, tetraethylphosphonium hydroxide, tetrapropylphosphonium hydroxide, tetrabutylphosphonium hydroxide, trimethylhydroxyethylphosphonium hydroxide, dimethyidihydroxyethylphosphonium hydroxide, methyltrihy-droxyethylphosphonium hydroxide, phenyltrimethylphosphonium hydroxide, phenyltriethylphosphonium hydroxide and benzyltrimethylphosphonium hydroxide, etc.

In another embodiment, the tertiary sulfonium hydroxides which can be recycled or purified in accordance with this invention may be represented by the formula

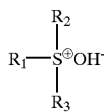

(IV)

wherein $R_1$, $R_2$ and $R_3$ are each independently alkyl groups containing from 1 to about 20 carbon atoms, hydroxy alkyl or alkoxy alkyl groups containing from 2 to about 20 carbon atoms, aryl groups, or hydroxy aryl groups, or $R_1$ and $R_2$ together with S may form a heterocyclic group provided that if the heterocyclic group contains a C=S group, $R_3$ is the second bond.

Examples of the tertiary sulfonium hydroxides represented by Formula IV include trimethylsulfonium hydroxide, triethylsulfonium hydroxide, tripropylsulfonium hydroxide, etc.

The waste solutions containing organic hydroxides which are purified or recycled in accordance with the process of the present invention are mixtures, preferably solutions, containing an oxidizable liquid and from about 0.01% to about 50% by weight of the organic hydroxide and generally will contain varying amounts of one or more undesirable impurities, for example, anions such as halide, carbonate, formate, nitrite, nitrate, sulfate, etc., some cations such as metals including zinc and calcium, sodium, potassium and some neutral species such as photoresists, methanol, amines, etc. The oxidizable liquid may be water, mixtures of water and an organic liquid such as an alcohol and the like.

In one embodiment, the process of the present invention is effective in reducing the amount of both ionic and nonionic impurities present in solutions of organic hydroxides such as quaternary ammonium hydroxides. In a further embodiment, the process of the present invention results in a reduction of metal ion impurities as well as organic impurities in a solution of an organic hydroxide compound such as quaternary ammonium hydroxide.

Organic hydroxides are commercially available. Additionally, organic hydroxides can be prepared from the corresponding organic salts such as the corresponding organic halides, carbonates, bicarbonates, formates, sulfates and the like. Various methods of preparation are described in U.S. Pat. Nos. 4,917,781 (Sharifian et al) and 5,286,354 (Bard et al) which are hereby incorporated by reference. There is no particular limit as to how the organic hydroxide is obtained or prepared.

In accordance with the process of the present invention, the organic hydroxides such as those described above are synthesized, purified or recycled from a waste solution in a process involving contacting the waste solution with a metal ion scavenger.

A waste solution may be a solution of an organic hydroxide after it has been used in a process, especially in developing processes associated with printed circuit board and microelectronic chip fabrication. As a result of the process, impurities enter and contaminate the solution. In other words, the waste solution may be a spent solution of an organic hydroxide. In addition to the organic hydroxide, the waste solution may contain any of the impurities described above and/or organic salts corresponding to the organic hydroxide and/or other particulates. Onium salts corresponding to the onium hydroxides generally include onium halogens such as onium chlorides, onium nitrates, onium sulfates, onium phosphates, onium molybdates, onium tungstates, onium formates and the like. Impurities or side reactants may also enter and contaminate synthetic solutions.

Prior to contacting the waste solution or synthetic solution with a metal ion scavenger, the waste solutions or synthetic solutions containing the onium compound and impurities may be optionally concentrated or treated to facilitate the inventive process. That is, the concentration of the organic hydroxide in the waste solution or synthetic solution may be increased prior to contact with a metal ion scavenger. In most embodiments, it is preferable to concentrate the waste solution prior to practicing the present invention or as the first step of practicing the invention. Concentration procedures are known to those skilled in the art and include evaporation, ion exchange, electrodialysis, and reverse osmosis among others. Pretreatment may involve at least one treatment with ozone, activated carbon, a high overpotential anode, and nanofiltration. These treatments serve to decrease the amount of organic photoresist contaminants in an onium compound solution.

The waste solution or synthetic solution containing the organic hydroxide (and/or an organic salt corresponding to the organic hydroxide) and impurities is contacted with a metal ion scavenger. A metal ion scavenger is a compound which selectively coordinates, complexes or otherwise bonds with metal ions in the presence of quaternary onium ions. In this context, metal ions include ions of alkali metals, alkaline earth metals, transition metals, and other metals. More specifically, metal ions included ions of lithium, sodium, potassium, rubidium, cesium, beryllium, magnesium, calcium, strontium, barium, scandium, titanium, vanadium, chromium, manganese, iron, cobalt, nickel, copper, zinc, yttrium, zirconium, niobium, molybdenum, rubidium, rhodium, palladium, silver, cadmium, tungsten, osmium, iridium, platinum, gold, aluminum, indium, tin, lead, antimony, bismuth, thallium and others. In a preferred embodiment, the metal ion scavenger contains at least one of a chelating compound, a nanoporous compound, and a magnetically MACS material.

In a more preferred embodiment, the metal ion scavenger contains a chelating compound containing at least one of an iminophosphonate compound, a sulfide compound, an iminodiacetate compound, bipyridyl compounds, beta alumina, ferrocyanide compounds, zirconium phosphate compounds, titanate compounds, and the like. In another embodiment, the metal ion scavenger contains a polymer containing at least one of an iminophosphonate moiety, a sulfide moiety, a thiol moiety, a bipyridyl moiety, and an iminodiacetate moiety. Such chelating compounds are generally commercially available, or they may be synthesized by those skilled in the art.

In one embodiment, the metal ion scavengers may be used without further preparation. For example, metal ion scavengers may be incorporated into a liquid, and used in liquid-liquid extraction, or incorporated into a liquid and mixed with an onium hydroxide solution or synthetic solution followed by separation. In another embodiment, the metal ion scavengers are incorporated into a polymer so that the polymer contains chelating moieties. In another embodiment, the metal ion scavengers or polymers containing metal ion scavengers are attached to a support. The support may be a polymer bead, membrane, silicone containing compound, or a support connected to a silicone compound which in turn is connected to the metal ion scavenger or polymer thereof, sand, silica gel, glass, glass fibers, alumina, nickel oxide, zirconia, or titania, or other media containing the metal ion scavenger. Two or more metal ion scavenger materials may be combined, for example, including a combination of two or more metal ion scavenger materials each in a different form, such as a powder and a fiber, depending upon the identity and properties of the organic hydroxide solution.

Examples of the metal ion scavenger materials include gelled or porously-shaped chelating resins produced by introducing chelating groups into a polymer or copolymer base of, for example, styrenic polymers or copolymers such as polystyrene and the like, acrylic polymers or copolymers such as polyacrylic resins and the like, methacrylic polymers and copolymers such as polymethacrylic resins and the like and tetrafluorethylenic polymers or copolymers such as polytetrafluoroethylene and the like, or into a modified polymer or copolymer base to be prepared by modifying the polymers or copolymers with a crosslinking agent such as divinylbenzene or the like.

Specific preferred examples include chelating resins sold under the trade designations AMBERLITE®, DUOLITE and PUROLITE from Rohm & Haas Co, LEWITIT from Bayer, and DIANON from Mitsubishi Kasei Corp. More specific examples include those under the trade designation AMBERLITE, such as IRC-718, those under the trade designation DUOLITE, such as C467 and GT-73, and those under the trade designation PUROLITE, such as S940 and S950 from Rohm & Haas Co.; those under the trade designation LEWITIT TP260 and TP208 from Bayer; and those under the designation DIAION, such as CR10, CR11, CR20, and CRB 02 from Mitsubishi Kasei Corp.

In another embodiment, the metal ion scavenger is a nanoporous compound that selectively coordinates, complexes or otherwise bonds with metal ions in the presence of quaternary onium ions. Nanoporous materials typically selectively coordinate, complex or otherwise bond with metal ions instead of onium ions because the metal ions are generally smaller than the onium ions. In a preferred embodiment, the metal ion scavenger is a crosslinked nanoporous resin, such as a polystyrene resin crosslinked with divinylbenzene. Highly crosslinked resins are even more preferred, especially those with at least about 10% crosslinking.

Examples of nanoporous resins sold under the trade designations LEWITIT from Bayer and AMBERLITE® and others from Rohm & Haas Co. More specific examples include those under the product designation CT122 and CT124 from Rohm & Haas Co.; and those under the trade designation AMBERLITE® 200, and under the trade designations LEWITIT VPOC 1060 and K1131 from Bayer.

In yet another embodiment, the metal ion scavenger is a MACS material containing a either a magnetic material or a paramagnetic material (hereinafter collectively termed magnetic materials) coated with a compound which selectively coordinates, complexes or otherwise bonds with metal ions in the presence of quaternary onium ions. Magnetic materials include rare earths or ferromagnetic materials including iron and iron oxides. The magnetic material may be partially or fully coated with a chelating compound and/or a cyclic ether compound, both of which may be incorporated into a polymer. For purposes of this invention, cyclic ether compounds include crown ethers and cryptands. The chelating compound and/or a cyclic ether compound may or may not be bonded to a polymer (those discussed above), that is, in turn, bonded to the magnetic metal.

Specific examples of cyclic ether compounds include crown ethers such as 12-crown-4 (1,4,7,10-tetraoxacyclododecane); 15-crown-5 (1,4,7,10,13-pentaoxacyclopentadecane); 18-crown-6 (1, 4,7,10,13,16-hexaoxacyclooctagecane); (12-crown-4)-2-methanol (2-(hydroxymethyl)-12-crown-4-); (+)-(18-crown-6)-2,3,11,12-tetracarboxylic acid, 4'-aminobenzo-15-crown-5; 4'-aminobenzo-18-crown-6; 2-(aminomethyl)-15-crown-5; 2-(aminomethyl)-18-crown-6; 4'-amino-5'-nitrobenzo-15-crown-5; 1-aza-12-crown-4; 1-aza-15-crown-5; 1-aza-18-crown-6; benzo-12-crown-4; benzo-15-crown-5; benzo-18-crown-6; bis[(benzo-15-crown-5)-15-ylmethyl]pimelate; 4'-bromobenzo-18-crown-6; dibenzo-18-crown-6; dibenzo-24-crown-8; dibenzo-30-crown-10; ar,ar'-di-tert-butyldibenzo-18-crown-6; dicyclohexano-18-crown-6; dicyclohexano-24-crown-8; 4'-formylbenzo-15 crown-5; 2-(hydroxymethyl)-12-crown-4; 2-(hydroxymethyl)-15-crown-5; 2-(hydroxymethyl)-18-crown-6; 4'-nitrobenzo-15-crown-5; 4-vinylbenzo-18-crown-6; 1,8-dihydroxy-dibenzo-14-crown-4; 1,11-diol-20-crown-6; poly-[(dibenzo-18-crown-6)-coformaldehyde]; and bis[(12-crown-4)-2-methyl] 2-methyl-2-dodecylmalonate. Various examples of formulae, and methods of preparing cyclic ether compounds are described in U.S. Pat. No. 5,393,892 to Krakowiak et al, the subject matter of which is hereby incorporated by reference. Cryptands include cyclic ether compounds which additionally contain nitrogen atoms in the ring structure, such as 2.2.2-cryptate and 2.2.1-cryptate.

The waste solution or synthetic solution is contacted with the metal ion scavenger in a variety of different ways generally depending upon the state of the metal ion scavenger. For example, the waste solution or synthetic solution can be combined with the metal ion scavenger in a container, the waste solution or synthetic solution can be passed through a column where the column contains the metal ion scavenger on a support, the waste solution or synthetic solution can be passed through media containing the metal ion scavenger, and the like. There is no particular limitation as to the methodology of contacting the waste solution or synthetic solution with the metal ion scavenger. In a preferred embodiment, when the metal ion scavenger is attached to a polymer bead, which itself is contained by a column, then the waste solution or synthetic solution is run through the column. In embodiments where the metal ion scavenger is attached to a polymer bead which is present in a container, the waste solution or synthetic solution is added, and the container is optionally shaken or otherwise agitated, followed by separating the solution from the polymer beads.

In embodiments where a MACS material is employed, the MACS material is separated from the solution by using an electromagnet and/or magnetic field. In particular, an electromagnet is permitted to contact the solution, or placed in near proximity of the solution, so that the magnetic material of the MACS material is attracted to and magnetically bound to or near the electromagnet. The solution is then separated from the magnetically bound MACS material.

In a preferred embodiment, it is important that the step of contacting the waste solution or synthetic solution with a metal ion scavenger is conducted before the step involving an electrochemical cell. As a result, substantial amounts of metal ions are not introduced into the electrochemical cell. This is important because in some embodiments, substantial amounts of metal ions in the waste solution or synthetic solution can decrease the effectiveness of the step involving an electrochemical cell. In this connection, substantial amounts of metal ions may contaminate the recovered or synthesized organic hydroxide. In another embodiment, the waste solution or synthetic solution is charged to an electrochemical cell, and the solution recovered from the electrochemical cell is subsequently contacted with the metal ion scavenger.

In accordance with the process of the present invention, before or after contact with a metal ion scavenger, the waste solution or synthetic solution containing the organic hydroxides such as those described above are added to an electrochemical cell. The step involving an electrochemical cell may be by electrolysis in an electrolytic cell or by electrodialysis in an electrodialytic cell. The electrochemical cells, generally speaking, contain at least an anode, a cathode, and a divider, and/or one or more unit cells assembled for operational positioning between the anode and the cathode. A number of electrolytic and electrodialytic cells containing various unit cells and multiple unit cells are described herein which are useful in the process of the present invention. Multiple unit cells may be defined by a number of compartments between an anode and a cathode (see, for example, FIG. 6), or multiple unit cells may be defined by a number of compartments including an anode and cathode (see, for example, FIG. 3). Multiple unit cells including an anode and cathode may take a monopolar configuration (see, for example, FIG. 3), or a bipolar configuration (see, for example, FIG. 7). There is no particular limit to the number of unit cells which can be used. Nevertheless, in one embodiment, electrochemical cells which are used according to the present invention contain from 1 to about 25 unit cells, and preferably from 1 to about 10 unit cells.

The unit cells may contain two or more compartments defined by the anode, cathode, and one or more dividers or separators which may be (1) nonionic microporous diffusion barriers such as screens, filters, diaphragms, etc., of controlled pore size or pore size distribution allowing or not allowing certain ions to pass through the divider or separator, or (2) ionic dividers or separators such as anion selective membranes and cation selective membranes which are preferred since their use generally results in the production of organic hydroxides of higher purity and in higher yield. The various dividers useful in the electrochemical cells used in the invention are described more fully below.

Electrochemical cells according to the present invention contain at least two compartments; namely, a feed compartment and a recovery compartment. Optionally, electrochemical cells according to the present invention may contain at least one water compartment, pass compartment and/or an inorganic salt or inorganic acid compartment. In certain embodiments, an electrochemical cell according to the present invention may have two or more of each of the compartments described above. In other embodiments, the electrochemical cell may have two or more of one or more of the compartments listed above. For example, in one embodiment, an electrochemical cell may have a feed compartment, two water or pass compartments and a recovery compartment.

A solution is charged to each compartment. The solution may be aqueous based, alcohol or glycol based, another organic solution or combinations thereof. In a preferred embodiment, the solution charged into each compartment is an aqueous solution. The solution charged into the feed compartment contains the organic hydroxide to be recycled or purified at a certain concentration. The concentration of the organic hydroxide initially charged into the feed compartment is in the range from about 0.1M to about 2M. In a preferred embodiment, the concentration of the organic hydroxide in the solution charged to the feed compartment is from about 0.2M to about 1M. In electrochemical cells containing two or more feed compartments, the concentrations of the organic hydroxide in the solutions charged into the feed compartments may be the same or different for each feed compartment. The concentration of the organic hydroxide in the solution charged to the cell is from about 1% to about 20% by weight and more often between about 2% and about 10% by weight. The feed compartment, as the term implies, holds the solution containing an organic hydroxide originating from the waste solution or synthetic solution which is to be recycled and processed by the present invention.

The recovery compartment initially is charged with a solution and preferably an aqueous solution. The solution charged to the recovery compartment may or may not contain an ionic compound. After passing a current through the electrochemical cell, the organic hydroxide may be recovered or otherwise obtained from the recovery compartment at a certain concentration. After passing a current through the electrochemical cell, the concentration of the organic hydroxide in the recovery compartment is generally higher than the concentration of the organic hydroxide in the solution initially charged into the feed compartment. In one embodiment, the concentration of the organic hydroxide in the recovery compartment is above about 0.1 M. In another embodiment, the concentration of the organic hydroxide in the recovery compartment is above about 0.2M. In a preferred embodiment, the concentration of the organic hydroxide in the recovery compartment is above about 1M. In electrochemical cells containing two or more recovery compartments, the concentrations of the organic hydroxide in the solutions recovered from the recovery compartments may be the same or different for each recovery compartment.

The water compartment, if present, contains a solution of an ionic compound at a certain concentration. The water compartment containing an ionic compound serves to maintain conductivity and enable lower operating cell voltages. An ionic compound is a chemical compound that ionizes in solution, such as an electrolyte. Examples of ionic compounds include salts, metal salts and acids or any compound which forms an anion and cation when dissolved in water. In a preferred embodiment, the ionic compound is the same as the organic hydroxide charged into the feed compartment. In another preferred embodiment, either the anion or cation of the ionic compound is the same as either the organic cation or hydroxide anion of the organic hydroxide charged into the feed compartment. In another embodiment, the ionic compound is different from the organic hydroxide charged into the feed compartment. The concentration of the ionic compound in the solution charged into the water compartment is in the range from about 0.1M to about 5M. In a preferred embodiment, the concentration is from about 0.3M to about 3M. And in a most preferred embodiment, the concentration is from about 0.5M to about 2M. In electrochemical cells containing two or more water compartments, the concentrations of the ionic compound in the solutions charged into the water compartments may be the same or different for each water compartment.

The pass compartment, if present, initially is charged with a solution and preferably an aqueous solution. The solution charged to the pass compartment may or may not contain an ionic compound. The ionic compound, if present, may be the same or different from the ionic compound of the water compartment. After passing a current through the electrochemical cell, the organic hydroxide passes through the pass compartment in embodiments where a pass compartment is used. Since most undesirable impurities do not pass through the pass compartment, the pass compartment serves to further purify the organic hydroxide.

The inorganic salt or inorganic acid compartment, if present, initially is charged with a solution and preferably an aqueous solution. The solution charged to the inorganic salt or inorganic acid compartment may or may not contain an ionic compound. The ionic compound, if present, may be the same or different from the ionic compound of the water compartment.

Several embodiments of electrochemical cells which may be used in the present invention will be described with reference to the figures. Although numerous embodiments of various electrochemical cells are described in the figures, it will be readily apparent to those skilled in the art that additional numerous embodiments not specifically described in the figures exist within the scope of the invention.

An embodiment of an electrochemical cell is illustrated in FIG. 1, which is a schematic representation of an electrochemical cell 10 containing an anode 11, a cathode 12 and a unit cell containing in sequence beginning at the anode 11, a divider 13, which in a preferred embodiment is a cation selective membrane. The electrochemical cell 10 contains two compartments; namely, a feed compartment 14 and a recovery compartment 15.

In operation of the electrochemical cell 10 illustrated in FIG. 1, a solution containing an organic hydroxide, such as an onium hydroxide is charged to the feed compartment 14. Water is charged to the recovery compartment 15. An electrical potential is established and maintained between the anode and the cathode to produce a flow of current across the cell whereupon the onium cation is attracted toward the cathode and passes through the divider 13 into the recovery compartment 15. The onium cation combines with hydroxide ions in the recovery compartment to produce the desired onium hydroxide. Impurities are not attracted to the cathode or do not pass through the divider and thus remain in the feed compartment. Regenerated onium hydroxide is formed and recovered from the recovery compartment 15.

Another embodiment of an electrochemical cell is illustrated in FIG. 2, which is a schematic representation of an electrochemical cell 20 containing an anode 21, a cathode 22 and a unit cell containing in sequence beginning at the anode 21, an anion selective membrane 23 and a cation selective membrane 24. The electrochemical cell 20 contains three compartments; namely, an inorganic salt or inorganic acid compartment 25, a feed compartment 26 and a recovery compartment 27.

In operation of the electrochemical cell 20 illustrated in FIG. 2, a solution containing an organic hydroxide is charged to the feed compartment 26. Water is charged to the inorganic salt or inorganic acid compartment 25 and the recovery compartment 27. An electrical potential is established and maintained between the anode and the cathode to produce a flow of current across the cell whereupon the organic cation of organic hydroxide is attracted toward the cathode and passes through the cation selective membrane 24 into the recovery compartment 27. The organic cation combines with hydroxide ions in the recovery compartment to produce the desired organic hydroxide. Impurities are attracted to the anode, and/or they are not attracted to the cathode and/or they do not pass through the cation selective membrane 24 and/or remain in the feed compartment. Regenerated organic hydroxide is formed and recovered from the recovery compartment 27.

Another embodiment of an electrochemical cell containing a polyunit cell of two unit cells utilized in a monopolar configuration is illustrated in FIG. 3, which is a schematic representation of an electrochemical cell 30 containing a first anode 31, a second anode 32, a cathode 35 and two unit cells containing in sequence, beginning at the first cathode 31, a first cation selective membrane 33, a second cation selective membrane 34, the cathode 35, a third cation selective membrane 36, and a fourth cation selective membrane 37. The electrochemical cell 30 illustrated in FIG. 3 contains six compartments; namely, a first feed compartment 38, a first pass compartment 39, a first recovery compartment 40, a second recovery compartment 41, a second pass compartment 42 and a second feed compartment 43.

In operation of the electrochemical cell illustrated in FIG. 3, an aqueous solution is charged to the pass and recovery compartments. A solution containing an organic hydroxide is charged to feed compartments. An electrical potential is established and maintained between the anodes and the cathode to produce a flow of current across the cell where upon the organic cation of the organic hydroxide is attracted to the cathodes thereby passing through the cation selective membranes 33, 34, 36 and 37 into the recovery compartments 40 and 41. The organic cation combines with hydroxide ions to produce the desired organic hydroxide in the recovery compartments 40 and 41. The organic hydroxide is then recovered from the recovery compartments 40 and 41.

Another embodiment of an electrochemical cell is illustrated in FIG. 4, which is a schematic representation of an electrochemical cell 50 containing an anode 51, a cathode 52 and a unit cell containing in sequence beginning at the anode 51, an anion selective membrane 53, a first cation selective membrane 54 and a second cation selective membrane 55. The electrochemical cell 50 contains four compartments; namely, an inorganic salt or inorganic acid compartment 56, a feed compartment 57, a pass compartment 58 and a recovery compartment 59.

In operation of the electrochemical cell 50 illustrated in FIG. 4, a solution containing an organic hydroxide is charged to the feed compartment 57. Water is charged to the inorganic salt or inorganic acid compartment 56, the pass compartment 58 and the recovery compartment 59. An electrical potential is established and maintained between the anode and the cathode to produce a flow of current across the cell whereupon the organic cation of the organic hydroxide is attracted toward the cathode and passes through the first and second cation selective membranes 54 and 55 and pass compartment 58 into the recovery compartment 59. The organic cation combines with hydroxide ions in the recovery compartment to produce the desired organic hydroxide. Impurities may be attracted to the anode, and/or they are not attracted to the cathode and/or they do not pass through the first and second cation selective membranes 54 and 55 and/or remain in the feed compartment. Regenerated organic hydroxide is formed and recovered from the recovery compartment 59.

Another embodiment of an electrochemical cell is illustrated in FIG. 5, which is a schematic representation of an electrochemical cell 60 containing an anode 61, a cathode 62 and a unit cell containing in sequence beginning at the anode 61, a bipolar membrane 63, an anion selective membrane 64, and a cation selective membrane 65. The bipolar membrane 63 has an anion selective side (not shown) facing the anode 61 and a cation selective side (not shown) facing the cathode 62. The electrochemical cell 60 contains four compartments; namely, a water compartment 66, an inorganic salt or inorganic acid compartment 67, a feed compartment 68, and a recovery compartment 69.

In operation of the electrochemical cell 60 illustrated in FIG. 5, a solution containing an organic hydroxide is charged to the feed compartment 68. Water is charged to the inorganic salt or inorganic acid compartment 67 and the recovery compartment 69. Water and an ionic compound is charged to the water compartment 66. An electrical potential is established and maintained between the anode and the cathode to produce a flow of current across the cell whereupon the organic cation of the organic hydroxide is attracted toward the cathode and passes through the cation selective membrane 65 into the recovery compartment 69. The organic cation combines with hydroxide ions in the recovery compartment to produce the desired organic hydroxide. Impurities are attracted to the anode, and/or they are not attracted to the cathode and/or they do not pass through the cation selective membrane 65 and/or remain in the feed compartment. Regenerated organic hydroxide is formed and recovered from the recovery compartment 69.

Another embodiment of an electrochemical cell is illustrated in FIG. 6, which is a schematic representation of an electrochemical cell 70 containing two unit cells. The electrochemical cell 70 contains an anode 71, a cathode 72 and in sequence beginning at the anode 71, a first bipolar membrane 73, a first cation selective membrane 74, a second bipolar membrane 75, and a second cation selective membrane 76. The bipolar membranes 73 and 75 have their anion selective sides (not shown) facing the anode 71 and cation selective sides (not shown) facing the cathode 72. The electrochemical cell 70 contains five compartments; namely, a water compartment 77, a first feed compartment 78, a first recovery compartment 79, a second feed compartment 80, and a second recovery compartment 81.

In operation of the electrochemical cell 70 illustrated in FIG. 6, a solution containing an organic hydroxide is charged to the feed compartments 78 and 80. Water is charged to the recovery compartments 79 and 81. Water and an ionic compound are charged to the water compartments. An electrical potential is established and maintained between the anode and the cathode to produce a flow of current across the cell whereupon the organic cation of the organic hydroxide is attracted toward the cathode and passes through either the first or second cation selective membrane 74 or 76 into the respective recovery compartment 79 or 81. The organic cation combines with hydroxide ions in the recovery compartments to produce the desired organic hydroxide. Impurities are attracted to the anode, and/or they are not attracted to the cathode and/or they do not pass through the cation selective membranes and/or remain in the feed compartments. Regenerated organic hydroxide is formed and recovered from the recovery compartments 82 and 85.

Figure 7:
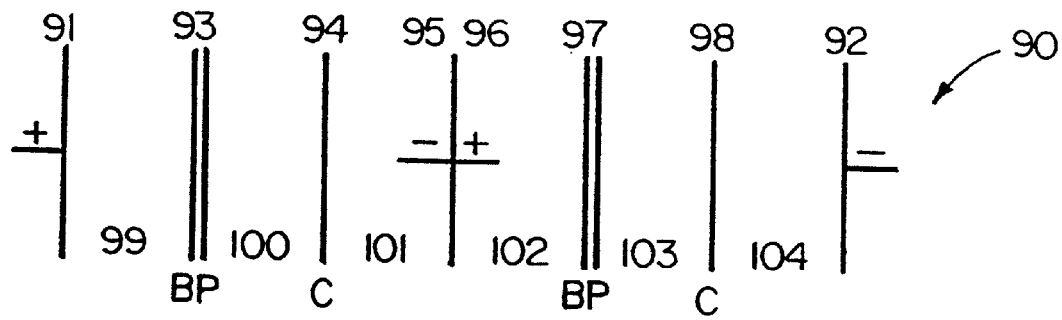
FIG. 7 is a schematic representation of an electrochemical cell containing a stack of two unit cells in a bipolar configuration.

In another embodiment, an electrochemical cell containing a polyunit cell of two unit cells utilized in a bipolar configuration, is illustrated in FIG. 7, which is a schematic representation of an electrochemical cell 90 containing a first anode 91, a first cathode 92 and in sequence, beginning at the first anode 91, a first bipolar membrane 93, a first cation selective membrane 94, a second cathode 95, a second anode 96, a second bipolar membrane 97, and a second cation selective membrane 98. The bipolar membranes have their anion selective sides (not shown) facing the anode and cation selective sides (not shown) facing the cathode. The electrochemical cell 90 illustrated in FIG. 7 contains six compartments; namely, a first water compartment 99, a first feed compartment 100, a first recovery compartment 101, a second water compartment 102, a second feed compartment 103 and a second recovery compartment 104.

In operation of the electrochemical cell illustrated in FIG. 7, an aqueous solution is charged to the recovery compartments. Water and an ionic compound are charged to the water compartments. A solution containing an organic hydroxide is charged to feed compartments. An electrical potential is established and maintained between the anodes and the cathodes to produce a flow of current across the cell where upon the organic cation of the organic hydroxide is attracted to the cathodes thereby passing through either the first or the second cation selective membranes 94 and 98 into the respective recovery compartments 101 and 104. The organic cation combines with hydroxide ions to produce the desired organic hydroxide in the recovery compartments 101 and 104. The organic hydroxide is then recovered from the recovery compartments 101 and 104.

Since the desired product is the organic hydroxide, the recovery compartment contains a solution of water, alcohol, an organic liquid or a mixture of water and alcohol and/or an organic solvent provided that the recovery compartment contains sufficient water so that the desired organic hydroxide may form or regenerate. The term regenerate is used to indicate that random organic cations and random hydroxide anions form organic hydroxides in solution.

Operation of the process of the present invention may be continuous or batchwise. Operation of the process of the present invention generally is continuous and certain components are continuously recirculated. Circulation is effected by pumping and/or by gas evolution.

Various materials can be used as anodes in the electrochemical cells. For example, the anode may be made of metals such as titanium-coated electrodes, tantalum, zirconium, hafnium or alloys of the same. Generally, the anodes will have a non-passivable and catalytic film which may comprise metallic noble metals such as platinum, iridium, rhodium or alloys thereof, or a mixture of electro-conductive oxides containing at least one oxide or mixed oxides of a noble metal such as platinum, iridium, ruthenium, palladium or rhodium. In one embodiment, the anode is a dimensionally stable anode such as an anode having a titanium base with ruthenium and/or iridium oxides thereon. In a preferred embodiment, the anode is a dimensionally stable anode having a titanium base with ruthenium oxide thereon.

Various materials which have been used as cathodes in electro-chemical cells can be included in the cells used in the above and other embodiments of the present invention. Cathode materials include nickel, iron, stainless steel, nickel plated titanium, graphite, carbon steel (iron) or alloys thereof etc. The term "alloy" is used in a broad sense and includes intimate mixtures of two or more metals as well as one metal coated onto another metal.

The electrochemical cell utilized in the process of the present invention contains at least one divider, such as an ionic selective membrane, and optionally at least one bipolar membrane. Compartments are defined as the area between two of: dividers and/or bipolar membranes and/or the anode (s) and/or the cathode(s). The dividers and/or bipolar membranes function as diffusion barriers and/or gas separators.

The dividers which can be utilized in the present invention can be selected from a wide variety of microporous diffusion barriers, screens, filters, diaphragms, membranes, etc., which contain pores of the desired size which allow cations of the organic hydroxide, such as onium cations, to migrate toward the cathode. The microporous dividers can be prepared from various materials including plastics such as polyethylene, polypropylene and TEFLON, (a trademark for polytetrafluorothylene) ceramics, etc. Microporous dividers such as nonionic dividers can be used, for example, in addition to the dividers listed in the Figures. Specific examples of commercially available microporous separators include: Celanese Celgard and Norton Zitex. Microporous separators are particularly useful when the process of the present invention is utilized to purify the higher molecular weight organic hydroxides such as tetra n-butyl phosphonium hydroxide and tetra n-butyl ammonium hydroxide.

The cation selective membranes used in the cells and the process of the invention may be any of those which have been used in the electrochemical purification or recycling of organic hydroxides. Preferably, the cation-exchange membranes should contain a highly durable material such as the membranes based on the fluorocarbon series, or from less expensive materials of the polystyrene or polypropylene series. Preferably, however, the cation selective membranes useful in the present invention include fluorinated membranes containing cation selective groups such as perfluorosulfonic acid and perfluorosulfonic and/ perfluorocarboxylic acid, perfluorocarbon polymer membranes such as sold by the E. I. dupont Nemours & Co. under the general trade designation "Nafion" such as DuPont's Cationic Nafion 902 membrane. Other suitable cation selective membranes include styrenedivinyl benzene copolymer membranes containing cation selective groups such as sulfonate groups, carboxylate groups, etc. Raipore Cationic R1010, (from Pall RAI), and NEOSEPTA CMH and NEOSEPTA CM1 membranes from Tokuyama Soda are useful particularly with the higher molecular quaternary compounds. The preparation and structure of cation selective membranes are described in the chapter entitled "Membrane Technology" in *Encyclopedia of Chemical Technology,* Kirk-Othmer, Third Ed., Vol. 15, pp. 92–131, Wiley & Sons, New York, 1985. These pages are hereby incorporated by reference for their disclosure of various cation selective membranes which can be useful in the process of the present invention. The use of at least one cation selective membrane in the electrochemical cell is preferred.

Any anion selective membrane may be utilized including membranes used in processes for the desalination of brackish water. Preferably, membranes should be selective with respect to the particular anions present in the cell (e.g., halide ions). The preparation and structure of anionic membranes are described in the chapter entitled "Membrane Technology" in *Encyclopedia of Chemical Technology,* Kirk-Othmer, Third Ed., Vol. 15, pp. 92–131, Wiley & Sons, New York, 1985. These pages are hereby incorporated by reference for their disclosure of various anionic membranes which may be useful in the process of the present invention.

Among the anion selective membranes which may be utilized in the electrochemical cell and which are commercially available are the following:

AMFLON, Series 310, based on fluorinated polymer substituted with quaternary ammonium groups produced by American Machine and Foundry Company; IONAC MA 3148, MA 3236 and MA 3475, based on polymer substituted with quaternary ammonium derived from heterogenous polyvinylchloride produced by Ritter-Pfaulder Corp., Permutit Division; Tosflex IE-SF 34 or IE-SA 48 made by Tosoh Corp. which is a membrane designed to be stable in alkaline media; NEOSEPTA AMH, NEOSEPTA ACM, NEOSEPTA AFN or NEOSEPTA ACLE-SP from Tokuyama Soda Co.; and Selemion AMV and Selemion AAV from Asahi Glass. In one embodiment, the Tosflex IE-SF 34 and NEOSEPTA AMH anion exchange membranes are preferred because of their stability in alkaline solutions, such as the hydroxide containing solutions which are involved in the process of the invention.

The bipolar membranes used in the electrochemical cells are composite membranes containing three parts: a cation selective side or region, an anion selective side or region, and an interface between the two regions. When a direct current passes across a bipolar membrane, with the cation selective side toward or facing the cathode, electrical conduction is achieved by the transport of $H^+$ and $OH^-$ ions which are produced by the dissociation of water which occurs at the interface under the influence of an electrical field. Bipolar membranes are described, for example, in U.S. Pat. Nos. 2,829,095, 4,024,043 (single film bipolar membranes) and in 4,116,889 (cast bipolar membranes). The bipolar membranes useful in the process of the present invention include NEOSEPTA BIPOLAR 1 by Tokuyama Soda, WSI BIPOLAR, and Aqualytics Bipolar membranes.

The step involving an electrochemical cell is conducted by applying a current (generally direct current) between the anode and the cathode. The current which is passed through the electrochemical cell generally is a direct current dictated by the design and performance characteristics of the cell, which are readily apparent to those skilled in the art and/or can be determined by routine experimentation. Current densities between about 0.1 and about 50 amps per square inch may be used, and current densities between about 1 and about 10 amps per square inch are preferred. Higher or lower current densities can be used for certain specific applications. The current density is applied to the cell for a period of time which is sufficient to result in the regeneration or formation of the desired amount or concentration of the organic hydroxide in the recovery compartment.

During the step involving an electrochemical cell, it is generally desirable that the temperature of the liquids within the cell be maintained within the range of from about 5° C. to about 75° C., preferably from about 25° C. to about 45° C., and particularly the temperature is maintained at about 35° C. Also during the step involving an electrochemical cell, it is generally desirable that the pH of the liquids within the cell is either alkaline or acidic.

In one embodiment, the pH of the feed compartment is from about 1 to about 13, and preferably from about 4 to about 10, the pH of the water compartment is from about 0 to about 14, the pH of the recovery compartment is from about 12 to about 14, the pH of the pass compartment is from about 12 to about 14, and the pH of the inorganic acid or salt compartment is from about 0 to about 4. Since the claimed process is a purification process involving hydroxide ions and/or acid ions, the pH changes as the process is practiced, and in particular, the pH generally increases as the process is practiced.

Although not wishing to be bound by any theory, operation of the electrochemical cells according to the invention is believed to be based, in part, on the migration of the cation of the onium compound from the feed compartment to the recovery compartment as a result of the current applied.

The following examples illustrate the processes of the present invention. Unless otherwise indicated in the following examples and else-where in the specification and claims, all parts and percentages are by weight, all temperatures are in degrees Centigrade, and pressure is at or near atmospheric pressure.

EXAMPLE 1

A synthetic solution for forming TMAH containing aqueous 17% tetramethylammonium carbonate and 483 ppb sodium is charged to a column containing an iminophosphonate chelating resin known as Duolite C467 available from Rohm & Haas. The solution collected from the column is charged to the feed compartments of an electrochemical cell according to FIG. 3. The anode is made of titanium coated with ruthenium oxide and the cathode is made of nickel. Water and an ionic compound are charged into the recovery and pass compartments. An electrical potential is applied thereby causing tetramethylammonium cations to migrate towards the cathode thereby regenerating tetramethylammonium hydroxide having reduced metallic impurities in the recovery compartment. The concentration of tetramethylammonium hydroxide in the recovery compartment is above 20%. The recovery compartment also contains less than 3 ppb sodium.

EXAMPLE 2

A recycling solution for regerating TMAH containing aqueous tetramethylammonium carbonate (1.0 mole/l), tetramethylammonium bicarbonate (1.75 mole/l), 8.7 ppb potassium, and 28 ppb sodium is charged to a column containing an iminophosphonate chelating resin known as Duolite C467 available from Rohm & Haas. The solution collected from the column is charged to the feed compartments of an electrochemical cell according to FIG. 2. The anode is made of titanium coated with ruthenium oxide and the cathode is made of nickel. Water and an ionic compound are charged into the recovery and pass compartments. An electrical potential is applied thereby causing tetramethylammonium cations to migrate towards the cathode thereby regenerating tetramethylammonium hydroxide having reduced metallic impurities in the recovery compartment. The concentration of tetramethylammonium hydroxide in the recovery compartment is above 1.9 mole/l. The recovery compartment also contains less than 3 ppb potassium and 3 ppb sodium.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for recovering onium compound from waste solutions or from synthetic solutions containing the onium compound and impurities including metal ion impurities comprising:
   (A) contacting the waste solution or synthetic solution with a metal ion scavenger to remove metal ion impurities, wherein the metal ion scavenger comprises at least one of chelating compound, a nanoporous material, and a magnetically assisted chemical separation (MACS) material;
   (B) charging the waste solution from (A) to an electrochemical cell comprising at least two compartments, a cathode, an anode and a divider and passing a current through the cell wherein the onium compound is regenerated or produced; and
   (C) recovering the onium compound from the cell.

2. The process of claim 1; wherein the concentration of the onium compound in the waste solution or synthetic solution is increased prior to or after step (A).

3. The process of claim 2, wherein the waste solution or synthetic solution is pretreated with at least one of ozone, activated carbon, a high overpotential anode, and nanofiltration.

4. The process of claim 1, wherein the metal ion scavenger comprises at least one of an iminophosphonate compound, a sulfide compound, a thiol compound, an iminodiacetate compound, a bipyridyl compound, beta alumina, a ferrocyanide compound, a zirconium phosphate compound, and a titanate compound.

5. The process of claim 1, wherein the metal ion scavenger comprises a polymer containing at least one of an iminophosphonate moiety, a sulfide moiety, a thiol moiety, a bipyridyl moiety, and an iminodiacetate moiety.

6. The process of claim 1, wherein the metal ion scavenger comprises a MACS material comprising a magnetic material and at least one of a chelating compound and a cyclic ether compound.

7. The process of claim 1, wherein the metal ion scavenger comprises a nanoporous material comprising a polystyrene resin crosslinked with divinylbenzene.

8. The process of claim 1, wherein the onium compound in the waste solution is at least one quaternary ammonium hydroxide represented by the formula

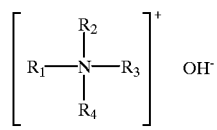

wherein $R^1$, $R^2$, $R^3$ and $R^4$ are each independently alkyl groups containing from 1 to about 10 carbon atoms, aryl groups, or $R^1$ and $R^2$ are alkylene groups which together with the nitrogen atom may form an aromatic or non-aromatic heterocyclic ring provided that if the heterocyclic group contains a–C=N–, $R^3$ is the second bond.

9. The process of claim 1, wherein the waste solution or the synthetic solution comprises an onium salt.

10. The process of claim 1, wherein the metal ion scavenger is incorporated into a liquid—liquid extraction process.

11. A process for recovering onium hydroxide from waste solutions or synthetic solutions containing the onium hydroxide and impurities including metal ion impurities comprising:

(A) contacting the waste solution or synthetic solution with at least one of a chelating compound, a nanoporous material, and a magnetically assisted chemical separation (MACS) material thereby decreasing the amount of metal ion impurities in the waste solution or synthetic solution;

(B) charging the waste solution or synthetic solution from (A) to an electrochemical cell comprising at least two compartments, a cathode, an anode and a cation selective membrane and passing a current through the cell wherein onium ions pass through the cation selective membrane and onium hydroxide is regenerated or produced; and (C) recovering the onium hydroxide from the cell.

12. The process of claim 11, wherein the onium hydroxide is at least one of a quaternary ammonium hydroxide, a quaternary phosphonium hydroxide, a tertiary sulfonium hydroxide, and a imidizolium hydroxide.

13. The process of claim 11, wherein the chelating compound comprises a polymer.

14. The process of claim 11, wherein the electrochemical cell comprises at least three compartments, a cathode, an anode, and in order from the anode to the cathode, an anion selective membrane and a cation selective membrane, the waste solution or synthetic solution from (A) is charged to a compartment formed by the anion selective membrane and the cation selective membrane, and the onium hydroxide is recovered from a compartment formed by the cation selective membrane and the cathode.

15. The process of claim 11, wherein the electrochemical cell comprises at least three compartments, a cathode, an anode, and in order from the anode to the cathode, a first cation selective membrane and a second cation selective membrane, the waste solution or synthetic solution from (A) is charged to a compartment formed by the anode and the first cation selective membrane, and the onium hydroxide is recovered from a compartment formed by the second cation selective membrane and the cathode.

16. The process of claim 11, wherein the waste solution or synthetic solution further contains an onium salt corresponding to the onium hydroxide.

17. A process for recovering an onium compound from waste solutions or synthetic solutions containing the onium compound and impurities including metal ion impurities comprising:

(A) charging the waste solution or synthetic solution to an electrochemical cell comprising at least two compartments, a cathode, an anode and a divider and passing a current through the cell wherein onium ions pass through the divider and the onium compound is regenerated or produced;

(B) recovering the onium compound solution from the cell;

(C) contacting the onium compound solution with a metal ion scavenger to remove metal ion impurities, wherein the metal ion scavenger comprises at least one of a chelating compound, a nanoporous material, and a magnetically assisted chemical separation (MACS) material; and (D) recovering the organic compound.

18. The process of claim 17, wherein the metal ion scavenger comprises at least one of an iminophosphonate compound, a sulfide compound, a thiol compound, an iminodiacetate compound, a bipyridyl compound, beta alumina, a ferrocyanide compound, a zirconium phosphate compound, and a titanate compound.

19. The process of claim 11, wherein the metal ion scavenger comprises a polymer containing at least one of an iminophosphonate moiety, a sulfide moiety, a thiol moiety, a bipyridyl moiety, and an iminodiacetate moiety.

20. The process of claim 17, wherein the metal ion scavenger comprises a MACS material comprising a magnetic material and at least one of a chelating compound and a cyclic ether compound.

21. The process of claim 17, wherein the metal ion scavenger comprises a nanoporous material comprising a polystyrene resin crosslinked with divinylbenzene.

22. The process of claim 17, wherein the onium compound in the waste solution or synthetic solution is at least one quaternary ammonium hydroxide represented by the formula

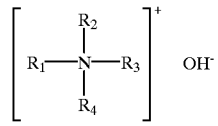

wherein $R^1$, $R^2$, $R^3$ and $R^4$ are each independently alkyl groups containing from 1 to about 10 carbon atoms, aryl groups, or $R^1$ and $R^2$ are alkylene groups which together with the nitrogen atom may form an aromatic or non-aromatic heterocyclic ring provided that if the heterocyclic group contains a—C=N–, $R^3$ is the second bond.

23. The process of claim 17, wherein the metal ion scavenger is incorporated into a liquid—liquid extraction process.

24. A process for recovering onium hydroxide from waste solutions or synthetic solutions containing the onium hydroxide and impurities including metal ion impurities comprising:

(A) charging the waste solution or synthetic solution to an electrochemical cell comprising at least two compartments, a cathode, an anode and a divider and passing a current through the cell wherein onium ions pass through the divider and onium hydroxide is regenerated or produced;

(B) recovering onium hydroxide solution from the cell;

(C) contacting the onium hydroxide solution with at least one of a chelating compound, a nanoporous material, and a magnetically assisted chemical separation (MACS) material to remove metal ion impurities; and (D) recovering the onium hydroxide.

25. The process of claim 24, wherein the onium hydroxide is a quaternary ammonium hydroxide, a quaternary phosphonium hydroxide or a tertiary sulfonium hydroxide.

26. The process of claim 24, wherein the chelating compound comprises a polymer.

27. The process of claim 24, wherein the electrochemical cell comprises at least three compartments, a cathode, an anode, and in order from the anode to the cathode, an anion selective membrane and a cation selective membrane, the waste solution or synthetic solution is charged to a compartment formed by the anion selective membrane and the cation selective membrane, and the onium hydroxide solution is recovered from a compartment formed by the cation selective membrane and the cathode.

28. The process of claim 24, wherein the electrochemical cell comprises at least three compartments, a cathode, an anode, and in order from the anode to the cathode, a first cation selective membrane and a second cation selective membrane, the waste solution or synthetic solution is charged to a compartment formed by the anode and the first cation selective membrane, and the onium hydroxide solution is recovered from a compartment formed by the second cation selective membrane and the cathode.

* * * * *